United States Patent [19]

Mejdell et al.

[11] 4,049,773
[45] Sept. 20, 1977

[54] PROCESS FOR PRECIPITATION OF ALUMINUM HYDROXIDE FROM ALUMINATE SOLUTION

[75] Inventors: Glør Thorvald Mejdell; Sven Arne Kjølberg, both of Porsgrunn, Norway

[73] Assignee: Norsk Hydro A.S., Olso, Norway

[21] Appl. No.: 675,216

[22] Filed: Apr. 8, 1976

[30] Foreign Application Priority Data

Apr. 16, 1975 Norway .................. 751367

[51] Int. Cl.$^2$ ............................................ C01F 7/06
[52] U.S. Cl. ............................................ 423/127; 23/301; 23/305 A; 423/121; 423/629
[58] Field of Search ............ 423/127, 629, 121; 23/305 A, 301 R

[56] References Cited

U.S. PATENT DOCUMENTS

| | | | |
|---|---|---|---|
| 1,943,786 | 1/1934 | Cowles | 423/127 |
| 2,380,804 | 7/1945 | Tiedemann | 423/629 |
| 2,653,858 | 9/1953 | Brown | 423/127 |
| 2,707,669 | 5/1955 | Houston et al. | 423/629 |
| 3,466,142 | 9/1969 | Hambly | 423/629 |
| 3,486,850 | 12/1969 | Day | 423/127 |
| 3,545,923 | 12/1970 | Mercier et al. | 423/127 |
| 3,649,184 | 3/1972 | Featherson | 423/629 |

*Primary Examiner*—Herbert T. Carter
*Attorney, Agent, or Firm*—Wenderoth, Lind & Ponack

[57] ABSTRACT

Aluminate mother liquor is passed countercurrent to the direction of feed of aluminum hydroxide crystals through at least two stages, each of which has a lower turbulent zone with a high suspension density and which is agitated under conditions which assure particle growth via crystal growth and an upper non-turbulent, stagnant liquid layer from which most crystals settle back into the respective lower turbulent zone. The suspension density in the stages is maintained at a constant level by sending crystal suspension from the lower turbulent zone in all the precipitation stages but the first to the preceding stage. Mother liquor is removed from the upper stagnant zone of all stages but the last stage and sent to the respective following stages. Coarse crystal suspension is removed from the turbulent zone of the first stage for separation of the crystals for further processing, while the mother liquor is returned to the system.

10 Claims, 2 Drawing Figures

PROCESS FOR PRECIPITATION OF ALUMINUM HYDROXIDE FROM ALUMINATE SOLUTION

BACKGROUND OF THE INVENTION

The present invention concerns a process for production of aluminum oxide from bauxite by the Bayer process. More specifically, the invention concerns the step of the process in which aluminum hydroxide is precipitated from supersaturated solutions of sodium aluminate, where the procedure of this invention makes it possible to attain considerable advantages over other known procedures.

In the so-called Bayer process, finely ground bauxite is treated in autoclaves at an elevated temperature (130°-250° C) with a concentrated sodium hydroxide solution (approx. 20-30%) containing sodium aluminate, whereby most of the bauxite's aluminum-oxide content is dissolved as sodium aluminate. After pressure release and separation of undissolved components (red mud) the aluminate solution is cooled further and diluted before it is sent to the precipitation stage, where seed crystals are added such that approximately half of the dissolved aluminum oxide is precipitated from the supersaturated aluminate solution as crystalline aluminum hydroxide. After the precipitation, the aluminum hydroxide crystals are separated from the mother liquor, which is then concentrated by evaporation and returned to the autoclaves for reuse in the extraction of bauxite. The largest crystals are removed by sedimentation classification, washed and calcined at 1000°-1300° C to give the final aluminum oxide product, while the finer aluminum hydroxide crystals are returned to the precipitators as seed crystals.

Formerly, the precipitation process was carried out as a batch process in either stirred or sparged mixing vessels. Addition of seed crystals to each vessel had to be very carefully controlled, and a high degree of supervision was necessary in general. Precipitator residence times of over 50 hours were normal.

More recently, some manufacturers have turned to continuous precipitation of aluminum hydroxide in order to reduce labor demands and down time during charging and discharging of the precipitators. In this case several large precipitators are operated in series, with transfer of liquid and crystals from one vessel to the next. Seed crystals are then introduced to the first vessel together with the fresh aluminate solution, and the product for calcination is removed as the coarsest fraction from a multistage classification and sedimentation unit, while the remaining fractions are returned to the first precipitator as the seed crystals mentioned above. Special treatment units for production of seed crystals are usually necessary in order to obtain optimal amount and size distributions. Thus, crystals and aluminate solution are sent cocurrent as a suspension through the series of precipitators, where the majority of the crystals are returned repeatedly to the first vessel necessitating internal transport (pumping) of large amounts of crystals. Also, the residence times for such continuous precipitation units are normally of the same order of magnitude as for batch operation, i.e. 30-50 hours.

With residence times of 50 hours, a yearly capacity of 500,000 metric tons aluminum oxide necessitates a volume of 50,000 cubic meters in the precipitation facility. Therefore, the precipitators account for a major part of the investment in an aluminum oxide plate.

SUMMARY OF THE INVENTION

The object of the present invention is to attain high production in the precipitation of coarse aluminum hydroxide particles of uniform size which do not need further classification or sieving to give the final product, and at the same time to obtain a satisfactorily low ratio of aluminum hydroxide to sodium hydroxide in solution. The foregoing is attained by means of a special continuous multistage process in which a high crystal-suspension density is maintained in all the precipitation stages without necessitating separate classification vessels for separation of fine and coarse crystals or repeated pumping of large amounts of crystals between stages. The process also permits good control of the precipitation under conditions which assure particle growth by crystal growth and agglomeration, without uncontrolled nucleation and the presence of large amounts of small particles in the final stage.

Special features of the procedure according to the invention are that precipitation of aluminum hydroxide from aluminate solution is carried out in a turbulent suspension of aluminum hydroxide crystals of as high suspension density as practically possible, that the aluminate-containing mother liquor is sent in series through two or more precipitation stages countercurrent to the aluminum hydroxide crystals produced, that in each precipitation stage a lower turbulent zone is maintained with the aforementioned high suspension density, which is agitated effectively under conditions which assure growth of existing crystals while over the turbulent zone there is maintained a non-turbulent, stagnant liquid layer where the majority of the crystals sedimentate back to the lower turbulent crystal suspension, that the suspension density in the last as well as earlier precipitation stages is held at a constant level by sending crystal suspension from the lower turbulent zone in one precipitation stage to the turbulent liquid zone in the preceding stage, and that mother liquor from one stage is sent to the following stage by removing coarse crystal suspension from the bottom of the first precipitation zone and separating the crystals for further processing, while the remaining mother liquor is returned to the system.

Further essential features of the process are apparent from the patent claims and the following description.

The precipitation process carried out according to the procedure of the invention has been shown to give a product as good as or better than that from known processes in terms of particle size, size distribution, and solid properties, even with residence times as low as 8-15 hours. For a given production, this represents a reduction of the necessary precipitation volume to ⅓-1/15 of that usual with known technology. Equipment for separation of small crystals from the coarser crystals which are taken out for calcination to the final product will also be unnecessary. Therefore, it is evident that the procedure will make possible considerable savings in the construction of new aluminum oxide plants.

BRIEF DESCRIPTION OF THE DRAWINGS

In the following discussion the procedure according to the invention will be described in more detail, by way of an example thereof which should not be considered restrictive, and with reference to the accompanying drawings wherein.

DETAILED DESCRIPTION OF THE INVENTION

Figure 1:
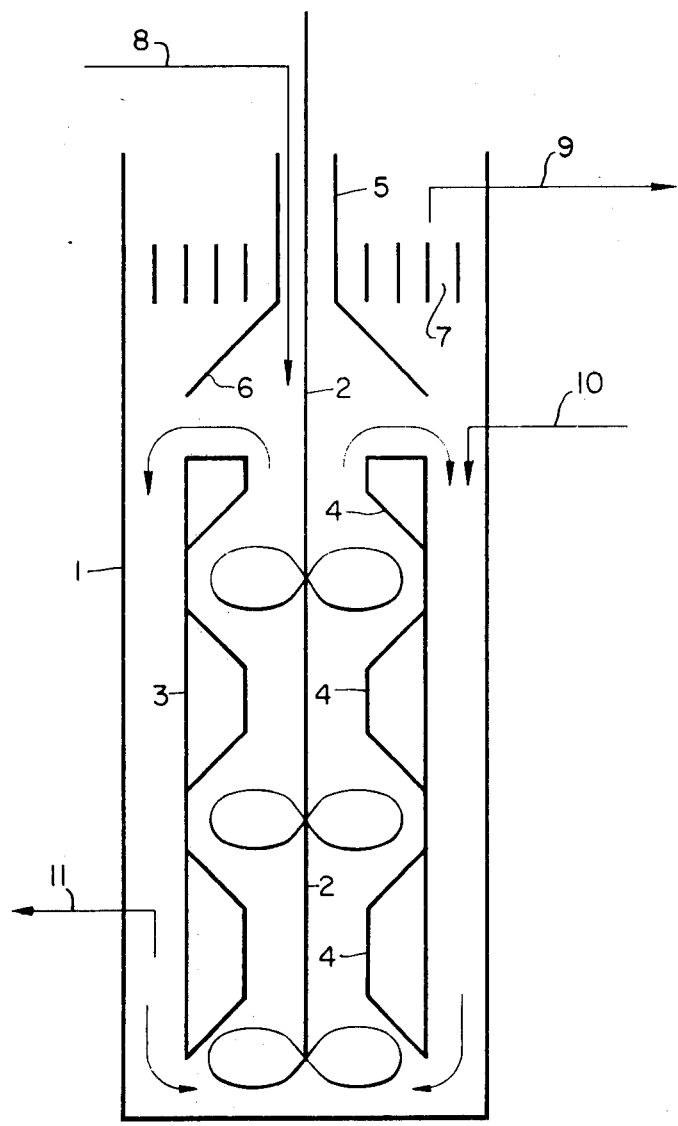
FIG. 1 is a diagrammatic section through the precipitator.

FIG. 1 shows diagramatically a section through one of the precipitators having therein agitators and baffles. The lower part of the precipitator 1 is shown to have an agitator, with the propeller 2 positioned in the usual fashion in a concentric tube 3 with baffles 4 such that the crystal suspension in this section is effectively agitated. The form of the agitator is not essential for the procedure according to the invention, which therefore also covers other methods of agitation, for example sparging with air or other gases. To reduce turbulence in the liquid, a concentric tube 5 having a lower funnel-shaped end 6 is mounted in the upper part of the precipitator. In order to further reduce turbulence so that crystals which are stirred up can settle back into the turbulent crystal suspension, one or more vertical baffles 7 are mounted in the upper section. The speed of the agitator must be adjusted according to precipitator dimensions and the form of the propeller, such that satisfactory agitation of the suspension is obtained together with substantially crystal-free mother liquor in the upper part of the vessel. In general, the agitator speed will have to be greater for coarse crystals, i.e. in the first precipitation stage, than for the finer crystals in the later stages. Fresh aluminate solution, or clear solution from the preceding stage, is introduced into the turbulent suspension through feed line 8, while the substantially clear solution from the top of the precipitator leaves the stage through overflow tube 9 and is sent to the next precipitation stage. Line 10 carries the crystal suspension from the following stage in the turbulent crystal suspension, while at the same time the suspension density is held at a constant level by pumping the suspension out of the stage through line 11.

Figure 2:
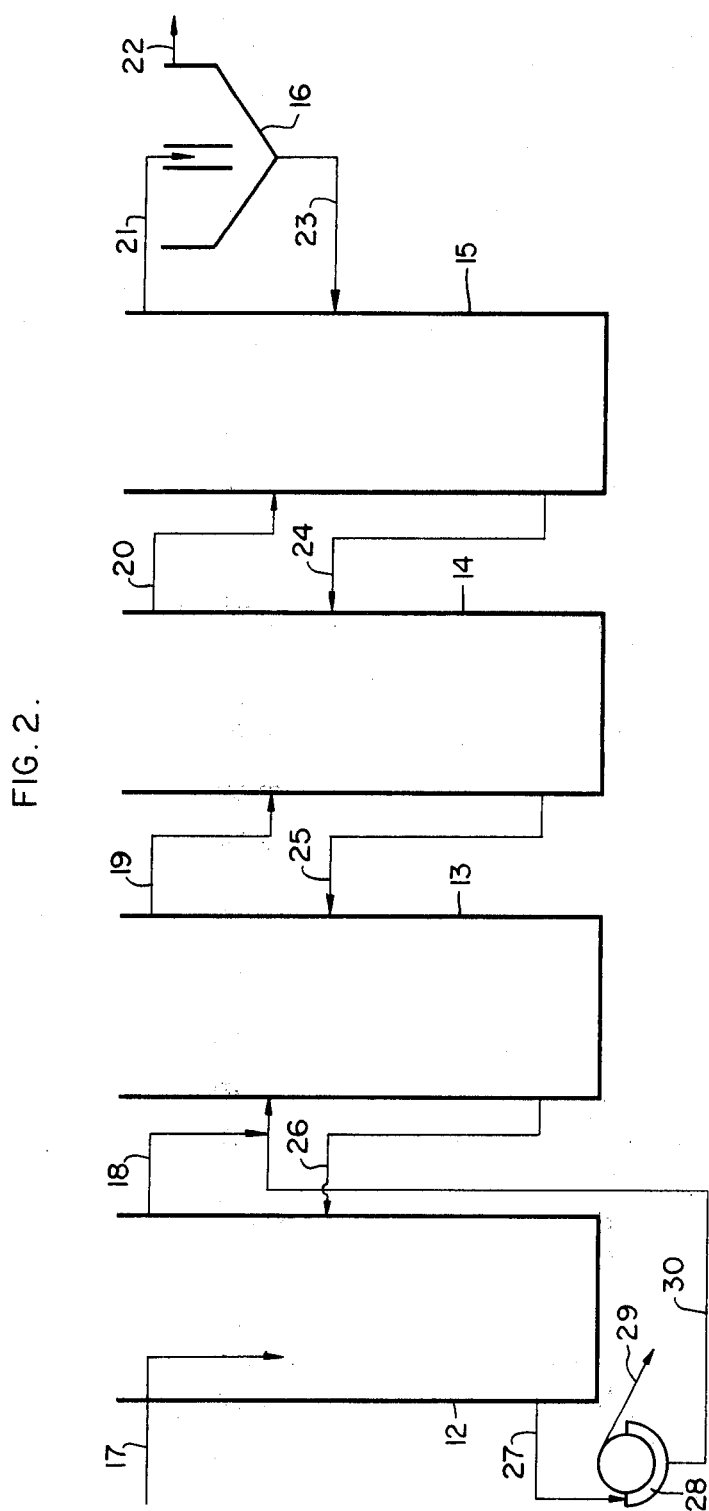
FIG. 2 is a schematic diagram of a facility with four precipitators in series.

FIG. 2 shows schematically a facility with four precipitators in series. Each of vessels 12, 13, 14 and 15 is constructed as shown in FIG. 1.

Fresh aluminate solution is introduced through line 17 to the turbulent suspension in the first precipitator 12, while clear liquid from the top of the vessel is transferred via overflow line 18 to the turbulent suspension in the second precipitator 13, etc., while the overflow line 21 from the last pecipitator 15 carries the aluminate-poor solution via settling vessel 16 and line 22 to evaporation and reuse in digestion of bauxite.

Any small crystals and crystal nuclei from settling vessel 16 are pumped via line 23 into the turbulent suspension in the last precipitator 15, where the suspension density is held at a constant high level, preferably between 30 and 40 volume percent. This is done by pumping suspension from the lower section of the last precipitation stage 15 via 24 to the turbulent suspension in 14. By pumping suspension in this fashion from one stage to the preceding stage the suspension density can be held at the desired high level in all vessels. The suspension which is pumped from the first vessel 12 contains aluminum hydroxide product. In the case of separation in a filter 28, for example, the coarse particles 29 are separated from the mother liquor which is returned via line 30 to the second precipitation stage.

High suspension density in the turbulent crystal suspension is a characteristic feature of the procedure. It has been found that specific production capacity increases with increasing suspension density. Although the highest possible suspension density is desirable from the standpoint of productivity, there will exist a practical upper limit for this where suspension stability problems can easily arise. Near this limit even a short stop or reduced agitation will allow the particles to settle, blocking the agitator. Stable operation has been obtained with suspension densities of 30-40 volume percent, while densities of 60% have stopped the agitator. The values for suspension density referred to here are the measured volume fraction of particles after one hour's free sedimentation from a sample of the suspension.

The practical limit for suspension density will depend on the detailed form of the apparatus and agitator, and therefore the aforementioned 60% does not represent a restriction of the invention.

Another characteristic feature of the procedure according to the invention is that particles and mother liquor are sent countercurrent through the system. The suspension density in the vessels is held at a constant level by pumping suspension continuously (or discontinuously) from the last vessel to the next-to-last vessel, while suspension from the nexto-to-last vessel is pumped to the preceding vessel, etc. Ideally, the same number of crystals as found in the product stream is transported from any one stage to the preceding one. This leads to a transported crystal volume which is considerably less than in previously known processes. The suspension which is removed from the first vessel is upgraded to produce after separation (filtration or sedimentation, washing etc.) from the mother liquor, which is returned to the vessel. Any small particles which accompany the mother liquor out of the last vessel can be separated by filtration or sedimentation and returned to the last vessel.

Formation of fresh crystals for the last precipitation stage is caused partly by crystal nuclei and small crystals formed by fracture which are carried in from the preceding stages, having been too small to settle in the non-turbulent zones of these stages, and partly by fresh formation and growth of crystal nuclei in the last vessel itself. Formation of new nuclei is dependent on the supersaturation of the mother liquor and can therefore be controlled within certain limits by controlling the temperature in the last precipitation stages. In experiments which have been conducted there have been no nucleation problems. This is probably because of the self-regulating tendencies of the nucleation process, whereby increased nucleation will reduce the crystal size in the preceding stage and for the same suspension density increase the crystalline surface where growth takes place. This will lead to a lesser degree of supersaturation and reduce formation of fresh crystal nuclei in the last precipitation stages.

A further essential feature of the procedure is that through the use of baffles or the like a non-turbulent liquid layer is maintained in the upper part of the vessel where the majority of the crystals in the suspension settle back into the turbulent crystal suspension below, so that the aluminate solution which is transferred by overflow to the next precipitation vessel is essentially free of aluminum hydroxide crystals or contains only crystal particles of considerably lower size than the average for the crystals circulating in the turbulent crystal suspension. In this way a high suspension density is produced in the turbulent layer, with crystals increasing continually in size through deposition of aluminum hydroxide from the supersaturated solution onto the crystal surfaces.

In order to obtain a product with a desirably narrow size distribution it is advantageous to maintain the temperature in the first vessel at a level where the formation of fresh nuclei is sufficiently low. Normally this is attained at temperatures over 60° C, preferably over 75° C. To obtain a high degree of precipitation the temperature can be gradually lowered in the following stages. Such temperature differences are obtained by cooling the mother liquid to give the desired production of fresh crystal nuclei.

EXAMPLE

In the following is given an example based on experimental runs with a bench-scale apparatus with three precipitators in series.

In principle, the apparatus and precipitators were constructed as described above and shown in FIG. 1 and 2, except that only three vessels were used in series, not four as shown in FIG. 2. The total liquid volume in each vessel was 1.5 liters, and aluminate solution was fed to the first stage at a rate of 0.5 liters/hour. Therefore, the residence time in each vessel was 3 hours, giving a total system residence time of 9 hours. The suspension density in the turbulent suspension was maintained at 30 volume percent in all vessels, by transporting the suspension from one vessel to the preceding one with the help of air bubbles in so-called emulsifier pumps with periodic operation. The crystals in the suspension pumped out of vessel No. 1 were removed as the product in a filter, while the mother liquor was returned to vessel No. 2.

The feed of aluminate solution was maintained at approx. 103° C and contained 100 g $Na_2O/l$ and 105 g $Al_2O_3/l$.

Steady-state conditions were considered to have been reached after 4 days continual operation. The following operating conditions were then measured in the three precipitation stages, stages 1, 2 and 3, respectively:

| | |
|---|---|
| Stirrer speed, rpm | approx. 750, 600 and 450 |
| Temperature, ° C | 77, 67 and 55 |
| Weight ratio in effluent $Al_2O_3/Na_2O$ | 0.73, 0.61 and 0.57 |

During this run 24 g $Al_2O_3$/hour was produced. Referred to the total precipitation volume this corresponds to a production capacity of 5.3 kg $Al_2O_3/h,m^3$.

The product had the following size distribution:

| | |
|---|---|
| + 250 $\mu$m | 0.1% |
| 250 - 180 " | 0.1% |
| 180 - 125 " | 1.2% |
| 125 - 100 " | 4.2% |
| 100 - 80 " | 28.7% |
| 80 - 63 " | 38.4% |
| 63 - 45 " | 11.2% |
| - 45 " | 16.1% |

Average crystal size: 75 $\mu$m

We claim:

1. A process for continuous precipitation of aluminum hydroxide from an aluminate solution produced by digestion of bauxite in concentrated sodium hydroxide solutions at elevated pressure and temperature with subsequent separation of undissolved components, where the precipitation is carried out in more than one stage and in the presence of seed crystals, and where the precipitated aluminum hydroxide after washing can be transformed to oxide by heating to temperatures over 700° C., while the mother liquor remaining after the precipitation is concentrated by evaporation and returned for reuse in the digestion of bauxite, said process comprising:
    passing the aluminate mother liquor counter-current to a feed of aluminum hydroxide crystals through at least two precipitation stages arranged in series;
    maintaining in each precipitation stage a lower turbulent zone with a high suspension density, and agitating said zone sufficiently to maintain crystals therein in suspension;
    maintaining over each turbulent zone a non-turbulent, stagnant liquid layer from which the majority of the crystals settle back into the respective lower turbulent zone;
    maintaining the density in the last as well as preceding precipitation stages at a constant level by sending crystal suspension from the lower turbulent zone in all precipitaton stages but the first to the preceding precipitation stage;
    removing mother liquor from the upper stagnant zone of all but the last stages and sending such removed mother liquor to the following stage; and
    removing coarse crystal suspension from the turbulent zone in said first stage for separation of the crystals for further processing, while returning the remaining mother liquor to the system.

2. A process for precipitation of aluminum hydroxide as claimed in claim 1, comprising maintaining in the turbulent zone of each precipitation stage a suspension density of over 10 volume percent, measured as fraction of settled solids from free sedimentation after standing for one hour.

3. A process for precipitation of aluminum hydroxide as claimed in claim 1, comprising maintaining in the turbulent zone of each precipitation stage a suspension density of from 30–50 volume percent, measured as volume fraction of settled solids from free sedimentation after standing for one hour.

4. A process for precipitation of aluminum hydroxide as claimed in claim 1, comprising maintaining the temperature in said first stage above 60° C.

5. A process for precipitation of aluminum hydroxide as claimed in claim 4, comprising maintaining the temperature in each precipitation stage lower than the temperature in the immediately preceding stage, such temperature differences being adjusted by cooling the mother liquor to cause production of fresh crysral nuclei.

6. A process for precipitation of aluminum hydroxide as claimed in claim 5, wherein the crystal suspension in said last precipitation stage is created by at least one of sedimentation of small crystals carried by the aluminate stream from the preceding stage and formation and growth of crystal nuclei caused by the increase in the supersaturation of the aluminate solution accompanying cooling of the mother liquor.

7. A process for precipitation of aluminum hydroxide as claimed in claim 1, comprising maintaining the temperature in said first stage above 75° C.

8. A process for precipitation of aluminum hydroxide as claimed in claim 7, comprising maintaining the temperature in each precipitation stage lower than the temperature in the immediately preceding stage, such temperature differences being adjusted by cooling the mother liquor to cause production of fresh crystal nuclei.

9. A process for precipitation of aluminum hydroxide as claimed in claim 8, wherein the crystal suspension in said last precipitation stage is created by at least one of sedimentation of small crystals carried by the aluminate stream from the preceding stage and formation and growth of crystal nuclei caused by the increase in the supersaturation of the aluminate solution accompanying cooling of the mother liquor.

10. A process for precipitation of aluminum hydroxide as claimed in claim 1, wherein the crystal suspension removed from the bottom of the turbulent zone in said precipitation stages is transferred to the turbulent zone of the respective preceding precipitation stages.

* * * * *